United States Patent [19]
Evans

[11] 3,847,721
[45] Nov. 12, 1974

[54] HEAT RECOVERABLE ARTICLES AND METHODS THEREFOR

[75] Inventor: Joseph H. Evans, Palo Alto, Calif.

[73] Assignee: Raychem Corporation, Menlo Park, Calif.

[22] Filed: Apr. 2, 1971

[21] Appl. No.: 130,730

[52] U.S. Cl.............. 161/108, 161/125, 161/149, 264/230, 264/288, 174/DIG. 8, 174/138 F, 138/156, 260/94.9 GA, 260/78 SC, 260/75 T, 260/86.7, 260/92.8 A, 260/93.7, 204/159.19, 204/159.2

[51] Int. Cl............................................. B32b 3/04

[58] Field of Search ......... 174/138 F, 84 R, DIG. 8; 138/156, 151, 163, 168, 178; 264/285, 230, 280, 342, 288, 234, 235, 237, 345, 346, 172, 22; 161/100, 99, 108, 149, 101, 125, 108, 100, 99, 412, 411; 156/84, 85

[56] References Cited
UNITED STATES PATENTS

| | | | |
|---|---|---|---|
| 3,086,242 | 4/1963 | Cook | 264/230 |
| 3,223,764 | 12/1965 | Kahn et al. | 264/235 |
| 3,239,125 | 3/1966 | Sherlock | 264/230 |
| 3,632,726 | 1/1972 | Knox et al. | 264/235 |
| 3,483,285 | 12/1969 | Foley | 264/146 |
| 3,542,077 | 11/1970 | Muchmore | 138/178 |
| 3,445,898 | 5/1969 | Goodrich | 24/16 |
| 3,455,336 | 7/1969 | Ellis | 138/156 |
| 3,574,313 | 4/1971 | Tanka | 138/168 |
| 229,532 | 7/1880 | Hipwell | 138/168 |
| 2,782,805 | 2/1957 | Leadbeater | 138/168 |
| 3,416,991 | 12/1968 | Yoshimura | 161/101 |
| 3,433,688 | 3/1969 | Staats et al. | 264/230 |
| 3,526,683 | 9/1970 | Heslop et al. | 264/230 |

*Primary Examiner*—George F. Lesmes
*Assistant Examiner*—R. J. Roche
*Attorney, Agent, or Firm*—Lyon & Lyon

[57] ABSTRACT

Described herein are articles which are heat recoverable in involute fashion to an overlapping, generally cylindrical configuration and which are useful as wrap-around sleeves for wires, cables, cable splices and the like. Also described are articles initially heat recoverable to an elongate "S" shaped configuration, which latter can be wrapped about an elongate substrate, the edge portions thereof interlocked, and heat recovered to form a protective closure. The articles of the invention comprise a molecularly oriented unitary polymeric layer which has been differentially annealed while restrained against dimensional change and cross-linked to provide an anisotropic gradient from a first to a second primary face of the layer through the thickness thereof. Subsequently, when the article is heated to recovery temperature, regions of high anisotropy adjacent one primary face of the layer shrink. Because of the annealing process, regions adjacent the opposite primary face of the layer tend to resist linear shrinkage, whereupon the article heat recovers in involute fashion to form a wrap-around sleeve.

14 Claims, 8 Drawing Figures

PATENTED NOV 12 1974 3,847,721
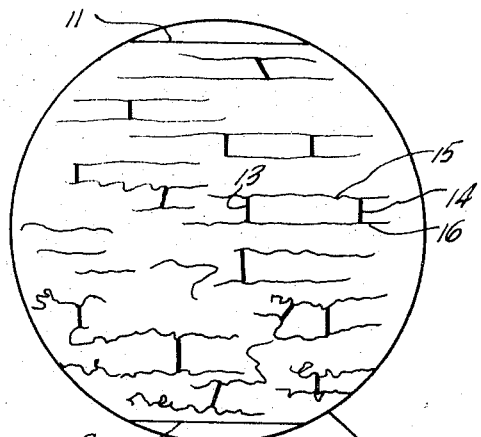
FIG.1.
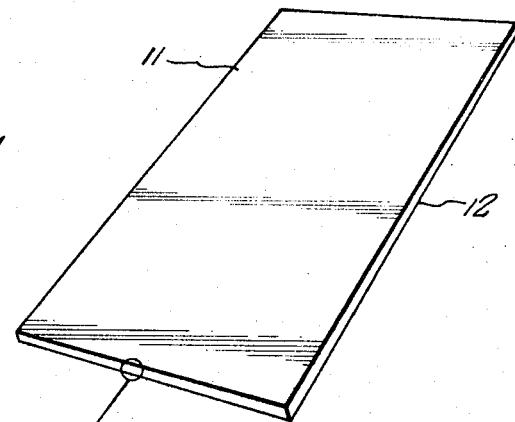
FIG.3.
FIG.2.
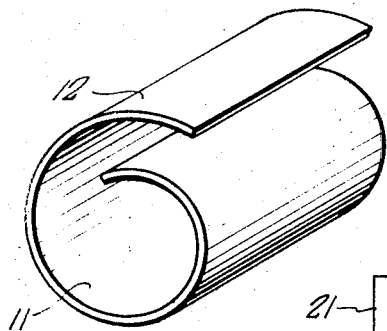
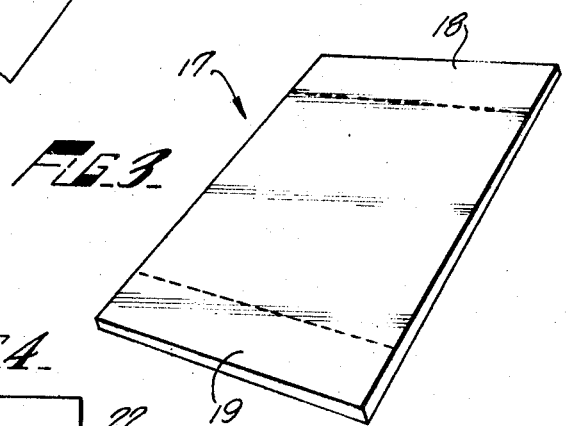
FIG.4.
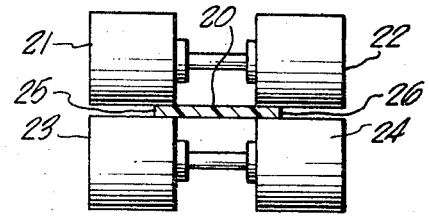
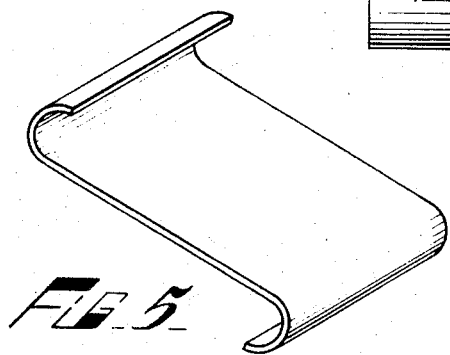
FIG.5.
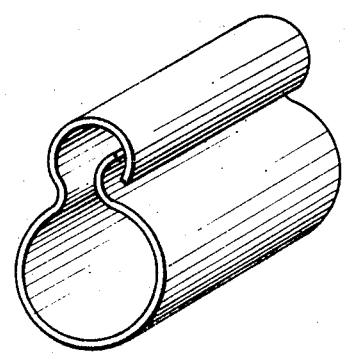
FIG.6.
FIG.7.
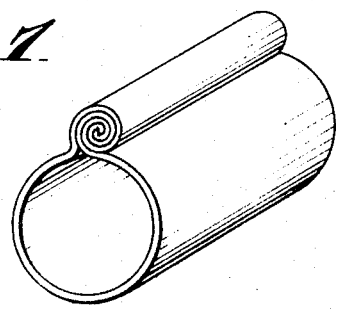
FIG.8.
INVENTOR.
JOSEPH H. EVANS
BY
Lyon & Lyon
ATTORNEYS.

HEAT RECOVERABLE ARTICLES AND METHODS THEREFOR

FIELD OF THE INVENTION

This invention relates to heat recoverable articles suitable for use as wrap-around sleeves which can be easily and conveniently installed on cables, wire splices and the like.

BACKGROUND OF THE INVENTION

Heat recoverable articles have found widespread acceptance in employment as seals or other closures in the repair and protection of generally tubular conduits such as pipe joints and electrical conductors. Typically, such articles have comprised heat recoverable tubular sleeves which describe in cross-section an integral, closed curve. Among the heat recoverable sleeves so-configured are those produced according to U.S. Pat. Nos. 3,086,242 and 2,027,962, the disclosures of which are incorporated herein by reference.

While such sleeves are generally satisfactory in many applications, they require first the provision of a free end in the conduit to be protected, over which the sleeve can be slipped. That manner of application is often manifestly inconvenient. For example, where a secondary electrically conductive line is to be tapped or spliced into a primary carrier, it is desirable that the splice be protected by application of a sleeve which does not require for its placement the disengagement of the existing carrier. Again, where a conduit carrying gas, water or other fluid cracks, it is desirable to stop the resultant leakage by application of a sleeve which for its placement does not require creation of a break in the pipeline and removal of the damaged conduit therefrom. To the same extent, it is desirable to repair cracks in cable insulation without necessitating the provision of a free end by breaking the cable.

It has been proposed to form wrap-around closures which for their application do not require a free end of the substrate to be protected, the closures being formed from a heat recoverable tube which is longitudinally slit, placed about the substrate, edge-joined by mechanical means, and heat-recovered to a snug, sealant configuration. See for example U.S. Pat. Nos. 3,455,336 and 3,379,218, the disclosures of which are incorporated herein by reference. While those closures have to a great degree lessened the difficulties related above, the need remains for a wrap-around heat recoverable sleeve which can be quickly and conveniently applied without resort to the additional positive steps required for mechanical joinder of closure edges. That need has been met in a large part by the invention disclosed in the concurrently filed application of Sovish et al., assigned to the assignee of this application Ser. No. 130,678 filed Apr. 2, 1971, abandoned in favor of Divisional application Ser. No. 348,348 filed Apr. 5, 1973, the disclosure of which is incorporated herein by reference. That application discloses articles rendered involutely heat recoverable by lamination of a first heat recoverable layer to a second, relatively non-heat recoverable layer which resists linear recovery of the first such that the laminated article curls upon recovery. While admirably meeting problems raised by the prior art, however, the invention of Sovish et al., suffers the disadvantage of requiring a plurality of laminae.

BRIEF SUMMARY OF THE INVENTION

According to this invention there is provided an article and a method for making the same, the article having a molecularly oriented unitary polymeric layer differentially annealed and cross-linked to provide an anisotropic gradient from a first to a second primary face of the layer through the thickness thereof such that the article is involutely heat recoverable to an overlapping, generally cylindrical configuration. By a second embodiment of the invention there are provided articles and methods therefor, the articles having been processed as above mentioned to form opposed anisotropic gradients at the opposite edge portions thereof such that articles embodying said layer are initially heat recoverable to a configuration describing in cross-section an elongate "S". An article so recovered can be deployed around a substrate to be protected, the arcuate edge portions thereof positioned in interlocking relation, and heat applied to the interlocked edge portions causing them to further heat recover in interspiralling fashion to form a bonded seam resistant to separation in service.

One object of this invention is to provide a heat recoverable article which, unlike a typical heat shrink sleeve, does not require for its application to a substrate the presentation of a free end thereof.

Another object is to provide a heat recoverable article which will involutely curl upon application of heat.

A further object of the invention is the provision of a wrap-around closure which can be made fast without resort to mechanical means.

Yet another object of the invention is to provide a heat recoverable article which will involutely curl upon application of heat to form a self-sealing, generally tubular protective covering.

A further object of the invention is to provide an involutely heat recoverable article which can be formed from a single unitary polymeric layer.

These and other objects and advantages of the invention will become apparent upon reference to the following detailed description and to the accompanying drawings (not to scale) in which like reference numerals refer to like elements and in which:

FIGS. 1 and 2 are perspective views of an article according to this invention before and during heat recovery, respectively, FIG. 1 including an enlargement of the edge portion of said article;

FIGS. 3 and 5–8 are perspective views of successive stages in the manufacture of one embodiment of the invention; and FIG. 4 schematically illustrates apparatus which may be employed in manufacturing the embodiment of FIGS. 3 and 4–8.

DETAILED DESCRIPTION OF THE INVENTION

It is well known that a wide variety of thermoplastic polymeric materials may be worked to orient the polymer molecules in a preferred direction. Orientation can be accomplished by uni-axial or bi-axial stretching. By uni-axial orientation, the molecules are assembled in columns facing the direction of stretch, e.g., lateral or longitudinal. Orienting bi-axially moves the molecules into both a longitudinal and lateral arrangement. Orientation can be achieved during extrusion or forming, or by racking or cold drawing after extrusion or forming. A preferred method of imparting molecular orientation is compression rolling in the absence of tension as disclosed in the copending application of Heslop, assigned to the assignee of the present application (Ser. No. 40,769, filed May 27, 1970 and now abandoned) the disclosure of which is incorporated herein by reference.

Among the many thermoplastic polymeric materials which can be oriented are polyolefins (polyethylene, polypropylene, etc.) as well as olefin copolymers (e.g., ethylene-ethacrylate copolymer); polyamides; polyvinylchloride; polyesters (e.g., polyethyleneterephthalate) and the like. Since such materials are rendered heat recoverable by orientation, they may be referred to as "post-orientation heat recoverable" materials.

The heat recoverability of molecularly oriented polymeric materials results, inter alia, from the fact that orientation tends to draw out polymer molecules from their normally coiled fashion to elongate, directed configurations like those depicted as thin, horizontally oriented lines adjacent primary face 11 in the enlargement of FIG. 1. Degrees of molecular orientation are characterized by the term "anisotropy" — materials of high anisotropy being characterized by greater levels of molecular organization or orientation than materials of low anisotropy. As the temperature of a polymeric material of high anisotropy is raised above a transition point or transition temperature the molecules tend to recover to configurations characteristic of a lower degree of anisotropy, viz, their normal coiled configuration. The extent of the recovery is a function of time and temperature for any given material and can occur slowly even at room temperature. Where that recovery occurs at a temperature less than the melting point of the polymeric material the recovery of individual molecules acts against the innate viscosity of the material to cause a gross dimensional change. Recovery at low temperatures, e.g., room temperature, can be restrained by crosslinking insufficient to restrain recovery to low anisotropy at temperatures in excess of the transition temperature of the polymeric material. Thus, with reference to the enlarged portion of FIG. 1, crosslinks such as those indicated at 13 and 14 prevent polymer molecules 15 and 16 from sliding, one past the other. However, the crosslinks are so spaced as not to prevent the linked molecules from seeking lower anisotropy at temperatures greater than the transition temperature of the material by a shrinking process best described as accordion-like "crumpling" of the polymer molecule. In the case of a lightly crosslinked group of polymer molecules the individual molecules decrease in length by such crumpling between the crosslinks. It will be appreciated, of course, that an undue density of crosslinks will prevent molecular recovery sufficient to result in gross dimensional changes of a polymeric article. Naturally the optimal degree of crosslinking will vary from polymer to polymer. It has been found that molecular recovery at low temperature is sufficiently restrained without preventing overall recovery at temperatures greater than the transition temperature of the material by a degree of crosslinking just sufficient to provide form stability at the melting temperature of the uncrosslinked polymer. By increasing the degree of crosslinking the unrestrained recovered radius is increased. The art-skilled can readily determine suitable crosslinking levels for any given polymeric material simply by visually determining whether a given level does or does not prevent overall recovery at temperatures above the transition temperature of the material.

As used herein, transition temperature refers to the crystalline melting temperature or glass transition temperature of a particular material. Crystalline melting point and crystalline melting temperature are considered synonymous as representing the temperature or temperature range at or within which a crystalline polymeric material changes from the crystalline to the amorphous state. Glass transition temperature and glass transition point are considered synonymous as representing the temperature or temperature range at or within which a hard, amorphous material softens.

An essential property of the articles of this invention is the ability to curl in involute fashion upon the application of heat. As used herein, "involute" refers to movement by which there is formed or a state in which the article so formed exists in the configuration of a closed spiral, i.e., a spiral in which overlapping portions are in abutting relation. That property is provided by differentially annealing a molecularly oriented unitary polymeric layer at a temperature and for a time sufficient to provide an anisotropic gradient from a first to a second primary face of the layer through the thickness thereof, while restraining the layer from dimensional change as by maintaining tension on a take-up reel (the articles of the invention are generally two dimensionally defined, i.e., their thickness is small relative to width and length and hence the "faces" or "primary faces" referred to herein are defined in area as the product of width and length). FIGS. 1 and 2 respectively depict an article according to this invention before and during heat recovery. The article has primary faces 11 and 12, which, because in this case no additional layers or coatings are present, also constitute the exterior faces of the article. The article is comprised of a polymer which has been uni-axially longitudinally oriented. Thereafter, the article has been differentially annealed to provide an anisotropic gradient through the thickness thereof, ranging from the region of high anisotropy adjacent to primary face 11 to a region of low anisotropy adjacent primary face 12. The differentially annealed article is then cross-linked so that a molecular configuration like that schematically illustrated in the enlargement in FIG. 1 is attained.

The region of high anisotropy can be described as being in latent compression relative to the region of low anisotropy inasmuch as when the article is heated above a transition temperature molecules in the high anisotropy region will recover from extended to coiled or crumpled configuration while those in the low anisotropy region will not. Recovery of the molecules in the highly anisotropic region acts against the innate viscosity of the material to occasion overall dimensional shrinkage — however, because molecules in the region of the low anisotropy do not recover to the same extent that region tends to restrain recovery of the overall article in linear fashion. Instead, the combination of recovery and restraint acts to produce the involute recovery in progress in FIG. 2.

Generally, with an oriented polymer heat recovery occurs at about the temperature at which the material was worked to impart orientation in the first place. It is for this reason that the polymeric materials employed in this invention are preferably oriented at elevated temperatures, e.g., at temperatures greater than a transition temperature of the material, so that at room temperatures the oriented article will not prematurely recover. Cold drawing, of course, can be employed to orient the polymer, but in this instance below room temperature storage may be required to prevent premature recovery. In general, the orientation process should insure that the polymer molecules are oriented faster than they are given opportunity to relax. Thus, it is desirable to rapidly cool an article oriented above its transition temperature to below that transition temperature as by water quench or (where suitable by reason of the thin nature of the article) by air cooling. Polymeric materials preferred in the instant invention are oriented at temperatures above their transition temperature and then quenched or otherwise rapidly cooled. The most preferred polymer, polyethylene, experiences a transition at a temperature between about 60°C and 130°C (depending on crystallinity and molecular weight) and the oriented polymer should be rapidly cooled to below the transition temperature.

Orientation may occur at temperatures greater than melting point of the polymer, followed by quench to lesser temperatures. In this case, the forming operation must be rapid and quickly followed by quench because otherwise oriented molecules are most prone to premature relaxation.

Differential annealing is achieved by selectively heating a molecularly oriented, unitary polymeric layer intended for use in the articles of the invention. Thus, heat can be applied to one primary face of such a layer and the layer quenched before the decrease in anisotropy attendant upon annealing becomes uniform throughout the thickness of the polymeric layer. Most preferably, the face of the article opposite that annealed by heat is purposely cooled to insure obtainment of a anisotropic gradient in the resulting article. For example, a polymeric layer may be heated on one face by a heating lamp or related means while simultaneously passing over and contacting with the opposite face thereof a chilled roller acting as a heat sink to maintain or reduce the temperature of regions adjacent said opposite face. By "cooling" of course, it is not intended to suggest that the temperature of the face opposite that annealed must necessarily be reduced in temperature — all that is required is that its temperature be maintained at a level below and for a time less than that which would result in uniform anisotropy throughout the thickness of the article. Other annealing mechanisms will readily occur to the art-skilled in light of the above, e.g., one face of the polymeric layer can be exposed to cold air as the opposite face passes across a hot roller, the polymeric layer may be passed between hot and cold rollers, a cold water spray may be directed against a face of the polymeric layer opposite that passing across a heated roller, etc. Naturally, the annealing operation is time and temperature dependent and optimal annealing at times and temperatures will vary from polymer to polymer. Whether a particular time-temperature combination is suitable or not can be readily determined by the art-skilled simply by visual observation, i.e., a determination whether the so annealed polymeric layer is involutely heat recoverable.

As before noted, the differentially annealed layer is cross-linked to a degree sufficient to prevent premature relaxation of oriented molecules at low temperature, yet insufficient to restrain overall dimensional change at elevated recovery temperatures. Preferably, molecules in regions of both high and low anisotropy are crosslinked so that heat recovery of those in regions of high anisotropy will not cause viscous flow in molecules in low anisotropic regions. Moreover, crosslinking of the molecules in the lower anisotropic region permits recovery at temperature which might otherwise result in melting of those regions and a decrease in the restraint required for involute heat recovery.

Crosslinking can be effected by chemical means suitable for use in the solid state, e.g., unsaturated polymers can be crosslinked by exposure to sulphur halides. Again, nitrated polymers can be crosslinked by exposure to diacyl halides or diisocyanates as respectively disclosed in Magay, U.S. Pat. Nos. 3,583,961 and 3,583,962, both filed Aug. 30, 1968, and assigned to the assignee of this application. Other polymers can be chemically crosslinked by means well known to the art-skilled. Alternatively, crosslinking can be effected by high energy ionizing radiation or by combinations of irradiation and chemical crosslinking. Radiation employed can be of various types including charged particles, e.g., beta and alpha, neutral particle, i.e., neutrons, and electromagnetic, i.e., gamma and ultra violet, as is well known.

The exterior faces of articles rendered involutely heat recoverable by incorporation of molecularly oriented differentially annealed layers according to this invention are most preferably comprised of materials which insure that opposed faces of the article which are presented to one another during involute heat recovery are bonded, one to the other. Thus, one or both primary exterior faces of the heat recoverable articles of the invention can be coated with a suitable adhesive, e.g., "Zetafax" ethylene-acrylic acid ester copolymer adhesive for polyethylene. Alternatively, the exterior faces of articles according to this invention may be constituted by layers of irradiation-degradable polymers such as butyl rubber so that upon recovery at high temperature the radiation-degraded polymer fuses with that presented by an opposite face of the article to form an integrally bonded structure.

Thus far, the articles of the invention have been referred to as recovering to an overlapping, generally cylindrical configuration. In other words, cross sections of the recovered article taken on planes perpendicular to its longitudinal axis will roughly correspond one to the other in shape and area. However, the term "generally cylindrical" does and is intended to encompass variations from a true cylinder which are due to radial inward recovery of the wrap-around sleeve such that the exterior surface of the recovered sleeve tends to conform to the irregularities of the substrate about which it is disposed, e.g., a wire splice or cable presenting an irregular exterior surface. In fact, that portion of the surface of the heat recoverable articles of the invention which ultimately abuts the surface of the protected substrate can be provided with a coating of grease, mastic or other material flowable at ordinary temperatures, so as the better to conform the inner wall of the ultimate recovered article to the irregularities of the protected substrate. For example, such a coating can be provided in heat recoverable articles intended for use as wrap-around sleeves for cable splices where a substantial amount of irregularity is present on the surface of the splice, the coating acting to inhibit corona discharge. Coatings flowable at ordinary temperatures and suitable for use in this invention are disclosed in U.S. Pat. No. 3,297,819, the disclosure of which is incorporated herein by reference. In general, the coating will act to discourage formation of a bond at interfaces formed during involute recovery by the presentation of polymer surfaces one to another. Accordingly, only that surface of the recovered article which will directly abut the substrate protected should be so coated. Of course, if for a particular reason it is desired that the flowable coating extend over a greater area of the surface of the recoverable article, there should yet be provided ample surface which is sufficiently free from interference by the flowable material that bonding can occur between adjacent layers in the recovered structure where bonding is considered essential in the particular employment.

Wrap-around solder sleeves can be formed according to this invention by affixing to the heat recoverable articles of the invention one or more pieces of solder spaced from one end of the article a distance sufficient to insure that, upon involute heat recovery about a wire splice or the like, the solder is presented to the interior of the formed cylindrical configuration. The solder fuses at the temperature of recovery to permanently join the spliced wires.

The principle of involute heat recovery embodied in this invention finds particular application in the formation of heat recoverable closure devices of the sort wherein edge portions of a heat recoverable wrap-around sleeve are joined to form a seam along the length of the sleeve. The closure device is especially useful in cases where the substrate to be protected is greater in radius than the radius of curl obtainable with commercially available thicknesses of involutely heat recoverable wrap-around sleeves, yet too small to justify the employment of clips, rods or other mechanical closure means. FIGS. 3 and 5-8 depict successive stages in the manufacture and recovery of closure devices provided according to the invention. With reference to FIG. 3, a molecularly oriented unitary polymeric layer having edge portions 18 and 19 denominated by phantom lines is differentially annealed in such fashion as to provide anisotropic gradients in the said edge portions which, relative to one another, are opposed. For example, with reference to FIG. 3, proceeding downwardly through the thickness of edge portion 18 one passes from a region of high anisotropy to one of low anisotropy. Passing downwardly through the thickness of an edge portion 19, on the other hand, one passes from a region of low anisotropy to one of high anisotropy. Consequently, when the annealed and subsequently crosslinked article is heated, it can initially assume the configuration depicted in FIG. 5, viz, a configuration describing in cross-section an elongate S. The now arcuate edge portions can be interlocked as shown in FIG. 6 and further heated, whereupon involute heat recovery causes interspiralling movement resulting in formation of the separation-resistant seam shown in FIG. 7. If desired, the heating process may be continued and heat applied to the formed tubular configuration to occasion radial shrinkage about a substrate (not shown) as suggested by FIG. 8.

In light of the foregoing, suitable means of providing the opposed anisotropic gradients will occur to the art-skilled. One such means is schematically depicted in FIG. 4, wherein a molecularly oriented polymeric layer 20 which is uniaxially oriented between sides 25 and 26 is shown passing through a stand of rollers 21, 22, 23 and 24. Rollers 21 and 24 are heated, whereas rollers 22 and 23 are chilled, as by circulating water. It will be apparent from an inspection of FIG. 4 that those regions of layer 20 adjacent rollers 21 and 24 will be annealed whereas those regions adjacent rollers 22 and 23 will be retained in a state of higher anisotropy.

Preferably, the involutely heat recoverable articles of the invention are greater than about 10 mils in thickness and most preferably the thickness ranges from about 10 to about 65 mils. Uni-axial expansion is the preferred method of orientation and, generally, expansion ratio ranges from about 1.5× to about 3×.

I claim:

1. An article having a molecularly oriented unitary polymeric layer which has been differentially annealed while restrained against dimensional change by heating said layer at a temperature and for a time sufficient to provide an anisotropic gradient from a first to a second primary face of said layer through the thickness thereof and thereafter crosslinked chemically or by irradiation, the resulting crosslinked article being involutely heat recoverable to an overlapping, generally cylindrical configuration.

2. The article of claim 1 wherein said cylindrical configuration is heat recoverable radially inwardly to the longitudinal axis thereof.

3. An article according to claim 1 which additionally comprises a piece of solder affixed thereto at a distance from one end of said article sufficient to insure that, upon heat recovery, said solder will be presented to the interior of the formed cylinder.

4. An article according to claim 2 wherein said layer is formed of polyethylene.

5. An article according to claim 2 wherein said layer is formed of an ethylene-ethylacrylate copolymer.

6. An article according to claim 1 whose primary faces are bondable to one another at the temperature of heat recovery.

7. An article according to claim 6 wherein the radial force generated by the article during heat recovery is sufficient to urge the said primary faces into bonded relation.

8. An article according to claim 1 having an adhesive on at least one primary face thereof.

9. An article having a molecularly oriented unitary polymeric layer, opposite edge portions of which, while restrained against dimensional change, have been differentially annealed by heating at a temperature and for a time sufficient to provide mutually opposed anisotropic gradients from a first to a second primary face of said layer at the said edge portions and through the thicknesses thereof, said edge portions being thereafter crosslinked chemically or by irradiation, the resulting crosslinked article being heat recoverable to a configuration describing an elongate S in cross-section.

10. An article according to claim 9 which has been heat recovered to a configuration describing an elongate S in cross-section.

11. An article according to claim 9 in which the edge portions comprising in cross-section the arcuate end portions of said S are adapted to be positioned in interlocking relation and further heat-recovered, in interspiralling fashion, to form a closure resisting separation.

12. An article according to claim 10 in which the edge portions comprising in cross-section the arcuate end portions of said S are adapted to be positioned in interlocking relation and further heat recovered, in interspiralling fashion, to form a closure resisting separation.

13. An article according to claim 11 in which at least one exterior face of one arcuate edge portion is bondable to the face of the other arcuate edge portion which it contacts during interspiralling at the temperature of heat recovery.

14. An article as in claim 13 wherein said edge portions are rendered bondable by provision of an adhesive on at least one said exterior face of said edge portion.

* * * * *